Jan. 19, 1960 A. G. BAUER 2,921,766
DOOR-BUCK SUPPORT
Filed May 6, 1958
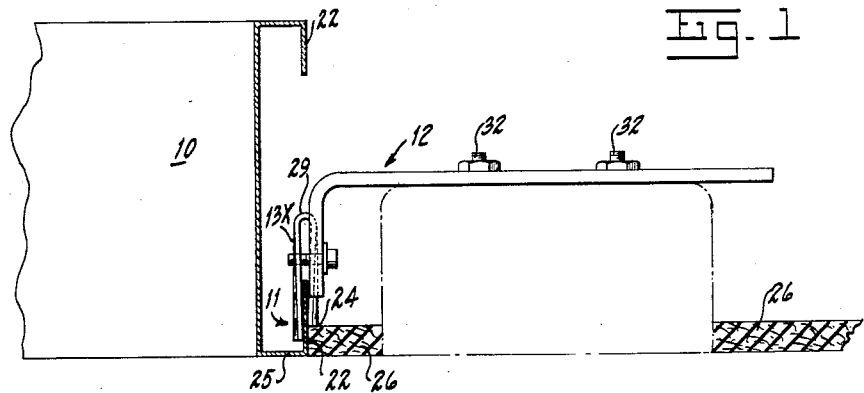
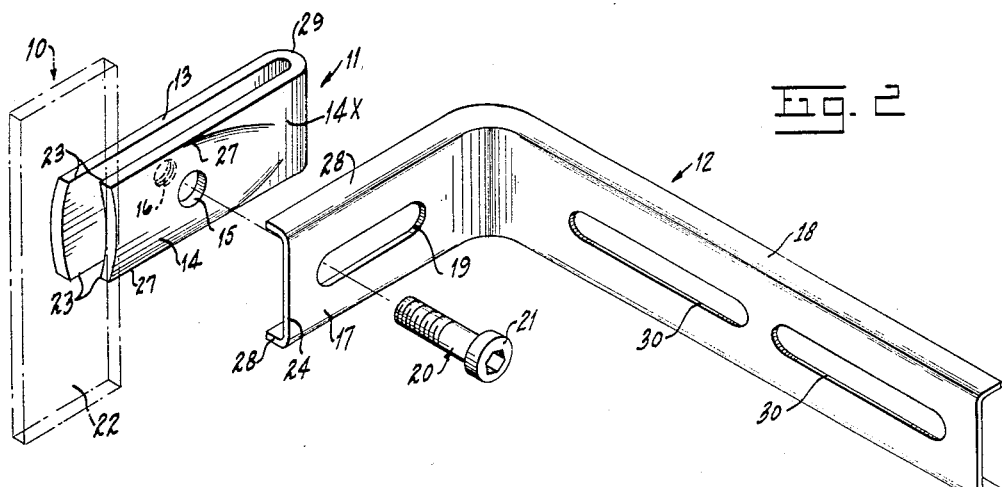
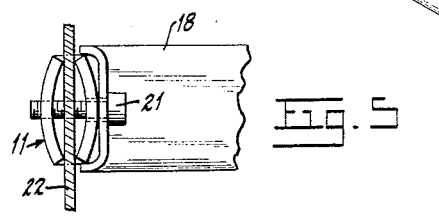
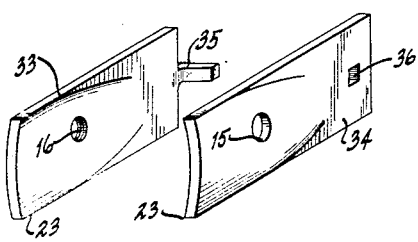
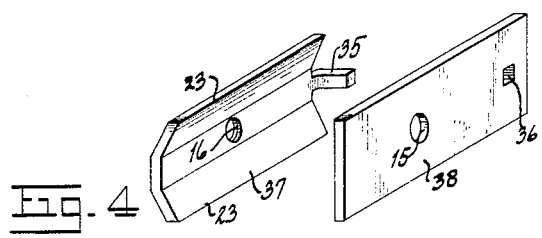

United States Patent Office 2,921,766
Patented Jan. 19, 1960

2,921,766
DOOR-BUCK SUPPORT

Arthur G. Bauer, Baldwin, N.Y.

Application May 6, 1958, Serial No. 733,424

2 Claims. (Cl. 248—226)

This invention relates to a door-buck support for electrical outlet boxes.

It is an object of this invention to provide a door-buck support of simple construction.

It is another object to provide a door-buck support of inexpensive manufacture.

These and other objects of this invention will become apparent upon reading the following descriptive disclosure taken in conjunction with the accompanying drawing in which:

Fig. 1 is a top view of the door-buck support secured to a door-buck shown in section and showing in outline an electrical outlet box secured to the support, Fig. 2 is an exploded perspective view of the door-buck support showing in outline a portion of the door-buck to which the support is clamped, Fig. 3 is an exploded perspective view of a two-piece or modified clamp, Fig. 4 is a modification of the two-piece clamp of Fig. 3, and Fig. 5 is an end view of the support secured to a door-buck.

Turning to the drawing, a door-buck 10 of conventional manufacture, for example of steel, such as are used to frame doors is shown in transverse section.

The support of this invention consists of a clamp 11 and a bracket 12.

The clamp 11 is preferably a U-shaped element having a pair of concave legs. As shown in the drawing one leg 13 is longer than the other leg 14. The legs are concaved toward one another and are each provided with an aperture, said apertures being disposed in linear relationship or opposite one another. The aperture 15 of the shorter leg is not threaded but the aperture 16 of the longer leg 13 is threaded.

As shown in the drawing, the bracket 12 is an L-shaped element having a clamp receiving or short section 17 and an outlet box or long section 18. Preferably the bracket is provided with a U-shaped configuration suitable to snugly receive the clamp leg 14 in the bracket section 17. The bracket section 17 is provided with an elongated slot 19 disposed in linear relationship to aperture 15. A suitable threaded bolt 20 having a suitable flanged head 21 capable of engaging the bracket section 17 about the slot 19 is pushed through the slot 19 and aperture 15 and then is threaded into the threaded aperture 16 of clamp leg 13.

The assembled clamp is now secured to the door-buck 10 (Figs. 1 and 2) by pushing a door-buck element 22 in between the clamp legs 13 and 14. Next the bolt 20 is tightened by turning it until the four edges 23 of the two legs 13 and 14 engage the flat door-buck element 22.

In this position clamp leg 14 is disposed within the U-shaped channel of bracket section 17 (Fig. 1). The bracket is then moved suitably to adjust the bracket edge 24 to be a suitable distance from the door-buck side wall 25 to permit for example a piece of wallboard 26 to be received therebetween.

After the bracket 12 has been correctly adjusted relative to the door-buck side-wall 25, the bolt 20 is firmly tightened so that the clamp edges 23 dig into the door-buck element 22.

As shown in Fig. 5, the tightening of bolt 20 into clamp leg 13 causes the concave legs 13 and 14 to expand outwardly. Thus the inner edges 27 of the clamp 11 securely bite into the sides 28 of the bracket section 17 when the bolt 20 is firmly secured in the clamp 11.

As shown in Figures 1 and 2, the concave legs 13 and 14 merge into a flat portion 13X and 14X respectively and the U-bend portion 29 of the clamp 11 is flat and not curved.

The bracket section 18 is provided with a pair of slots 30 so that a conventional electrical outlet box 31 may be secured to the bracket section 18 by bolts and nuts 32 passed through the slots 30.

As shown in Fig. 3 the clamp may be made of two pieces. In this modification the legs 33 and 34 may be concave throughout their entire length. The outer or longer leg 33 is provided with an integral tongue 35 turned inwardly at a right angle and the inner or shorter clamp leg 34 is provided with a suitable aperture 36 to suitably receive the tongue 35.

As shown in Fig. 4, the biting edges 23 may be produced by an angular faced clamp leg 37. Also one clamp leg 37 may be provided with contacting edges 23 while the other clamp leg 38 may be flat.

Flat clamp legs are operable in this invention. Thus one or both of the clamp legs may be flat if desired.

This invention is clearly of broad scope so that it is not to be limited to its illustrative embodiments.

Thus the aperture of leg 13 need not be threaded as a nut but may be separately secured to bolt 20 exteriorly of clamp leg 13. Also the bolt may be inserted first through the aperture of leg 13 and then through the aperture 15 of leg 14 and a wing nut (not shown) may be threadingly secured to the bolt and against bracket element 17. Furthermore the bolt may be inserted through the clamp leg 13 aperture and aperture 15 of clamp leg 14 said bolt being then welded permanently to clamp leg 13 so as to be in effect an integral part of clamp leg 13.

I claim:

1. A door buck support for electrical outlet boxes comprising a substantially U-shaped sheet metal clamp, the free ends of each of the legs of said clamp being crescent shaped and facing one another; an L-shaped bracket of U-shaped channel cross-section, said channel in one bracket leg being adapted to snugly receive a crescent shaped leg of said clamp, and screw threaded means disposed through the crescent shaped portion of said clamp legs and through said bracket leg receiving said clamp whereby tightening of said screw threaded means pushes the clamp legs toward one another thereby clamping a flat object held therebetween along lines of tangency and simultaneously said clamping effect tends to flatten the clamp leg held in said bracket thereby causing said leg to be wedged immovably in said U-shaped channel.

2. The door buck support of claim 1 where the U-shaped clamp is made of folded sheet stock of resilient metal.

References Cited in the file of this patent

UNITED STATES PATENTS

| 1,020,528 | Weir | Mar. 19, 1912 |
| 1,192,251 | Wilson | July 25, 1916 |
| 1,438,534 | Kuen | Dec. 12, 1922 |
| 1,532,726 | Berg | Apr. 7, 1925 |
| 1,930,242 | Lademann | Oct. 10, 1933 |